May 5, 1942.      J. HEEREMA ET AL      2,281,768
PHOTOPOLYMERIZATION OF VINYL HALIDES
Filed Aug. 17, 1939
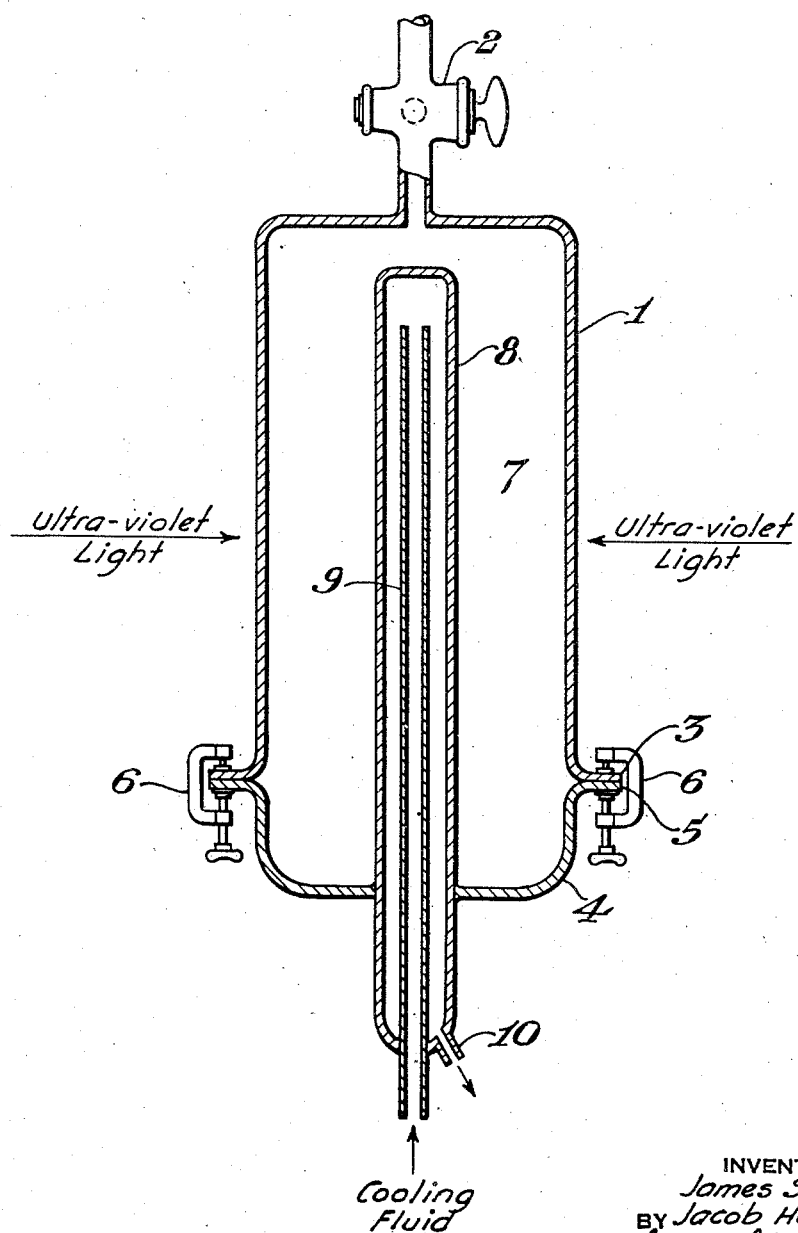
INVENTORS
James S. Owens
BY Jacob Heerema
Griswold & Burdick
ATTORNEYS Patented May 5, 1942

2,281,768

UNITED STATES PATENT OFFICE 2,281,768

PHOTOPOLYMERIZATION OF VINYL HALIDES

Jacob Heerema and James S. Owens, Midland, Mich., assignors to The Dow Chemical Company, Midland, Mich., a corporation of Michigan Application August 17, 1939, Serial No. 290,654

5 Claims. (Cl. 204—163)

This invention relates to the photopolymerization of vinyl halides in the vapor phase.

It has long been known that the polymerization of vinyl halides in the liquid phase is accelerated by exposing the monomeric halides or solutions thereof to ultraviolet light. However, prior workers have also stated that photopolymerization of vinyl halides does not occur in the vapor phase. Contrary to these teachings, we have now found that under certain operating conditions vapor-phase photopolymerization of vinyl halides is not only possible but is an advantageous method of preparing the polymeric compounds.

According to the invention, vinyl halides, particularly vinyl chloride, may be polymerized by exposing the vapors thereof to ultraviolet light, especially light including wave lengths below 3000 Angstrom units, in the proximity of a cooled surface, preferably a non-metallic surface with the light shining directly thereon. Under these conditions, vinyl halides polymerize at rates not far removed from those attained in the known liquid-phase photopolymerization, and the polymer formed deposits as a layer on the non-metallic surface, from which it may later be removed as desired.

The accompanying drawing illustrates one form of apparatus adapted to polymerizing vinyl halide vapors. The apparatus shown comprises an open cylindrical vessel 1 of transparent material such as glass or quartz, which is provided at its closed upper end with a sealed-in stopcock 2 and at its open lower end with a ground flange 3. This vessel is closed at its lower end by a head or cap 4 having a flange 5 adapted to register with the vessel flange 3. The vessel 1 and cap 4 may be held together firmly by clamps 6, forming a gas-tight polymerization chamber 7. Integral with the head 4 and extending upwardly therethrough into the chamber 7 is a closed tube 8, preferably of non-metallic material such as glass. This tube may be maintained at any desired temperature by introducing cooling fluid through an inner tube 9 positioned within the tube 8 and extending nearly to the top thereof, from which the cooling fluid overflows down the walls of the tube 8 and escapes through an outlet 10 near the bottom. The entire vessel 1 is placed near suitable light sources, such as quartz mercury arc lamps, so that it may receive ultraviolet light from both sides.

In practice, the polymerization chamber 7 is evacuated or swept free of extraneous gases, and is then filled with vinyl halide vapors, preferably at approximately atmospheric pressure, through the stopcock 2. Cooling water is run through the inner tube 9 so as to maintain the non-metallic tube 8 at a temperature below about 60° C. The polymerization vessel is then exposed to ultraviolet light, e. g. the light of a quartz mercury arc. After an induction period, polymerization of the vinyl halide begins, a fact frequently but not always evidenced by the appearance of a slight haze or fog within the chamber 7. The polymer formed begins to collect or condense principally on the non-metallic tube 8 as a rough coating or layer which builds up as long as irradiation is continued and monomeric vinyl halide vapors remain in the chamber. However, some of the polymeric vinyl halide formed settles to the bottom of the chamber 7 where it appears as a fine powder. After an induction period of 0.2–3.0 hours, polymerization rates of 0.2–5.0 per cent per hour are usually attained. When the polymerization has been carried to the desired extent, irradiation is stopped, and the vessel is opened to remove the polymer. The physical properties of the polymer obtained are substantially identical with those of vinyl halide polymers prepared according to the prior art.

The tube 8 is preferably formed of non-metallic material, especially glass or quartz. If the tube is of metal, or no tube is present, the rate of polymerization is low unless the thickness of irradiated vapor is great. When strips of metal are wrapped at intervals around the tube 8, the polymer forms for the most part on the exposed portions of the tube, and only slightly upon the metal surfaces.

In polymerization, the non-metallic condensing surface is cooled to a temperature below that of the surrounding vapors, being preferably maintained at a temperature below about 60° C., especially below about 30° C. In most cases, if temperatures above 60° C. are used, polymerization occurs only slowly. Below 60 C., the rate of polymerization increases with decrease in temperature of the non-metallic surface, temperatures of 5° to 15° C. being especially satisfactory. In operation it is preferable, though not essential, to maintain the parts of the polymerization vessel other than the non-metallic condensing surface at a temperature above about 60° C. so as to prevent any possible condensation of polymer on the vessel walls. The temperature of vinyl halide vapor itself is of little significance to the polymerization.

The intensity and wave length of the ultraviolet light sources used and their positions relative to the polymerization vessel also affect the polymerization. Thus, if the lights are so placed that the ultraviolet radiations fall on both the vapor in the chamber 7 and the non-metallic surface 8 the rate of polymerization is at least ten-fold that obtained when the light shines on the vapor but not upon the non-metallic surface. Appreciable polymerization does occur in the latter instance, however, and the polymer forms on the non-metallic surface, just as when that surface is irradiated. If the vapor is not irradiated, polymerization does not occur.

It has been found that ultraviolet light of wave length above 3000 Angstrom units is relatively ineffective in causing polymerization; for lower wave lengths, however, the rate of polymerization is an inverse function of the wave length of the ultraviolet light employed. Satisfactory rates are obtained when the vinyl halide vapors are polymerized in vessels of Pyrex glass which admit all ultraviolet radiations having wave length above about 2530 Angstrom units. However, if the irradiation is carried out in quartz vessels, which admit all wave lengths above about 2130 Angstrom units, the induction period before polymerization is decreased ten-fold, and the polymerization rate is increased twenty-fold.

The dimensions of the polymerization vessel, specifically the ratio of the vapor volume to the area of the non-metallic condensing surface, also affect the rate of polymerization. Thus, when the vessel has a relatively small vapor space, i. e. when the ratio: vapor volume in cubic centimeters/condensing area in square centimeters has a numerical value below 0.5, the polymerization rate is very slow, particularly if the ultraviolet light contains only those wave lengths above 2500 Angstrom units. In vessels of moderate vapor-space, in which the ratio is 2.0 to 10.0, satisfactory rates are obtained, and most of the polymer forms on the non-metallic surface. If the ratio: vapor volume/condensing area be further increased, say to 50, the polymerization rate is not greatly affected, but much of the polymer formed falls to the bottom of the vessel as a fine powder.

Although polymerization of vinyl halide vapors according to the invention is preferably carried out using substantially pure compounds, the method is also applicable to polymerization in the presence of diluent gases or vapors. Nitrogen, hydrogen, and most hydrocarbons and halohydrocarbon vapors affect the rate of polymerization only insofar as they dilute the vinyl halide vapors. Air and oxygen, however, are polymerization catalysts, although they considerably increase the length of the induction period before polymerization begins.

Vapor-phase photopolymerization has the advantage that diluents, solid catalysts, etc. are entirely unnecessary; no extraneous materials contaminate the polymeric product. In addition, the polymerization is easily controlled and may be made entirely continuous without encountering operating difficulties.

Other modes of applying the invention may be employed instead of those explained, change being made as regards the details disclosed, provided the step or steps stated in any of the following claims or the equivalent thereof be employed.

We claim:

1. The method of polymerizing vinyl chloride which comprises enclosing vinyl chloride maintained in the vapor state at approximately atmospheric pressure in a vessel made of a transparent material selected from the class consisting of glass and quartz and having therein a solid non-metallic surface formed of a material selected from the class consisting of glass and quartz, the ratio of the vapor space in said vessel to the area of the non-metallic surface being at least 2.0, maintaining the outer walls of said vessel at a temperature above 60° C. and the said non-metallic surface at a temperature below about 30° C. and below the temperature of the vinyl chloride vapor but above the condensation temperature of the vinyl chloride, and exposing the vessel and contents to ultraviolet light including wavelengths below 3000 Angstrom units for a time sufficient to cause formation of polymeric vinyl chloride, the said process being carried out in the substantial absence of liquid vinyl chloride.

2. The method of polymerizing vinyl chloride which comprises enclosing vinyl chloride vapor in a vessel having therein a surface formed of a material selected from the class consisting of glass and quartz and maintained at a temperature between about 5° C. and about 15° C., and exposing the vapor and the surface to ultraviolet light including wavelengths below 3000 Angstrom units for a time sufficient to cause formation of polymeric vinyl chloride, the said process being carried out in the substantial absence of liquid vinyl chloride.

3. The method of polymerizing a monomeric vinyl halide which comprises exposing vinyl halide vapor to ultraviolet light including wavelengths below 3000 Angstrom units while the vapor is in contact with a non-metallic surface formed of a material selected from the class consisting of glass and quartz and maintained at a temperature below that of the vinyl halide vapor and below about 60° C. but above the condensation temperature of the vapor, said process being carried out in the substantial absence of liquid vinyl halide and for a time sufficient to cause formation of polymeric vinyl halide.

4. A method according to claim 3 wherein the non-metallic surface is maintained at a temperature below about 30° C.

5. A method according to claim 3 wherein the vinyl halide is vinyl chloride.

JAMES S. OWENS.
JACOB HEEREMA.